United States Patent
Bott et al.

(10) Patent No.: US 11,774,921 B2
(45) Date of Patent: Oct. 3, 2023

(54) METHOD FOR DETERMINING OSCILLATIONS OCCURRING IN A MEASURING SIGNAL

(71) Applicant: Robert Bosch GmbH, Stuttgart (DE)

(72) Inventors: Andre Bott, Ludwigsburg-Poppenweiler (DE); Jan Gall, Stuttgart (DE); Torsten Welfonder, Leonberg (DE); Valentin Schwamberger, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 454 days.

(21) Appl. No.: 16/976,650

(22) PCT Filed: Mar. 7, 2019

(86) PCT No.: PCT/EP2019/055630
§ 371 (c)(1),
(2) Date: Aug. 28, 2020

(87) PCT Pub. No.: WO2019/170789
PCT Pub. Date: Sep. 12, 2019

(65) Prior Publication Data
US 2020/0409318 A1 Dec. 31, 2020

(30) Foreign Application Priority Data
Mar. 9, 2018 (DE) ................... 10 2018 203 574.1

(51) Int. Cl.
*G05B 13/02* (2006.01)
*F24F 11/38* (2018.01)
(Continued)

(52) U.S. Cl.
CPC .......... *G05B 13/025* (2013.01); *F24F 11/38* (2018.01); *F24F 11/64* (2018.01); *F24F 11/88* (2018.01); *G01F 1/3259* (2022.01)

(58) Field of Classification Search
CPC ..... G05B 13/025; G05B 13/045; F24F 11/38; F24F 11/64; F24F 11/88; G01F 1/3259;
(Continued)

(56) References Cited

U.S. PATENT DOCUMENTS

| 3,708,760 A | * | 1/1973 | Farkas | ............... H03B 7/06 331/165 |
| 5,394,322 A | * | 2/1995 | Hansen | ............... G05B 13/045 700/32 |

(Continued)

FOREIGN PATENT DOCUMENTS

| CN | 106527098 B | * 10/2016 | .......... G04F 10/005 |
| DE | 102009020744 A1 | * 11/2010 | ............... B01L 7/02 |

(Continued)

OTHER PUBLICATIONS

International Search Report for PCT/EP2019/055630, dated Jun. 21, 2019.

(Continued)

*Primary Examiner* — Michael J Dalbo
*Assistant Examiner* — Kaleria Knox
(74) *Attorney, Agent, or Firm* — NORTON ROSE FULBRIGHT US LLP; Gerard Messina (57) ABSTRACT

A method for determining oscillations occurring in a measuring signal. The method includes the steps of receiving a measuring signal, determining the extreme values of the received measuring signal, and ascertaining closed loops of the measuring signal, by a) identifying a closed loop in the measuring signal (a closed loop being formed by two half loops having identical oscillation width and opposite direction, b) storing the identified closed loop, c) removing the identified closed loop from the measuring signal, and d) repeating steps a) through c) until all closed loops have been ascertained.

15 Claims, 5 Drawing Sheets

(51) Int. Cl.
*F24F 11/64* (2018.01)
*F24F 11/88* (2018.01)
*G01F 1/325* (2022.01)

(58) Field of Classification Search
CPC ........ F16F 15/02; G07C 3/00; G06F 11/3409;
G06F 1/3296; H03L 7/193
See application file for complete search history.

(56) References Cited

U.S. PATENT DOCUMENTS

| | | | | |
|---|---|---|---|---|
| 5,406,474 A | * | 4/1995 | Hansen | G05B 13/045 |
| | | | | 700/42 |
| 6,081,751 A | * | 6/2000 | Luo | G05B 11/42 |
| | | | | 700/39 |
| 6,825,728 B1 | * | 11/2004 | Beard | H03L 7/193 |
| | | | | 331/17 |
| 8,630,741 B1 | * | 1/2014 | Matsuoka | F24F 11/88 |
| | | | | 700/12 |
| 8,868,250 B2 | * | 10/2014 | Jensen | G05B 11/16 |
| | | | | 700/40 |
| 2006/0090163 A1 | * | 4/2006 | Karisson | G06F 11/3409 |
| | | | | 718/105 |
| 2008/0136400 A1 | * | 6/2008 | Chi | G06F 1/3296 |
| | | | | 323/318 |
| 2009/0143919 A1 | * | 6/2009 | Balemi | F16F 15/02 |
| | | | | 700/280 |
| 2012/0323410 A1 | * | 12/2012 | Bendisch | G07C 3/00 |
| | | | | 701/3 |
| 2016/0103084 A1 | * | 4/2016 | Kleczewski | G01L 1/14 |
| | | | | 324/652 |
| 2019/0026644 A1 | | 1/2019 | Laleg et al. | |

FOREIGN PATENT DOCUMENTS

| | | |
|---|---|---|
| DE | 102009020744 A1 | 11/2010 |
| WO | 2010054657 A1 | 5/2010 |
| WO | 2016206696 A1 | 12/2016 |

OTHER PUBLICATIONS

Li et al., "Patents, Software and Hardware for PID Control: An Overview and Analysis of the Current Art," IEEE Control Systems Magazine, 26(1), 2006, pp. 42-54.

M. Köhler et al. "Zählverfahren und Lastannahme in Der Betriebsfestigkeit [Counting Methods and Load Assumption in Operational Stability]," Springer-Verlag, Chapter 2.4.4, 2012, pp. 23-27.

* cited by examiner

METHOD FOR DETERMINING OSCILLATIONS OCCURRING IN A MEASURING SIGNAL

FIELD

The present invention relates to a method for determining oscillations occurring in a measuring signal, which may be used, for example, in monitoring and/or adaptive control of a technical system, for example, a heating, ventilation, and air conditioning system.

BACKGROUND INFORMATION

Due to their well-known and simple application, so-called PID controllers are frequently used for controlling, for example, heating, cooling, and air conditioning systems, entertainment and domestic electronics, or industrial processes, for example, as occur in the chemical industry. A PID controller is a controller having a proportional component, an integral component, and a differential component.

The parameters of such PID controllers are often set using the heuristic methods of Ziegler and Nichols, which results in good disturbance behavior, in particular with strongly delayed stable processes, but in oscillating management behavior. That means, the method of Ziegler and Nichols is primarily suitable for processes whose load properties do not change significantly over time and in which an overshooting does not interfere.

If greater changes in the process dynamics or in the load properties are to be expected, the controller parameters are therefore frequently adaptively set. For this purpose, the control variable is continuously monitored with respect to oscillations around the setpoint value. As soon as an oscillation is established, the controller parameters are adapted in such a way that the oscillation in the control variable is eliminated (Li et al. "Patents, software and hardware for PID control: an overview and analysis of the current art," IEEE Control Systems Magazine, 26(1), pages 42-54, 2006).

The quality and accuracy of the ascertainment of the oscillations in the control variable is decisive for the regulating behavior, in particular for the management behavior achievable using the adaptive controller.

In general, the control variable may be separated into its oscillation components with the aid of the Fast Fourier Transform (FFT). However, with a broad window, a good resolution in the frequency range results in a poor resolution in the time range, which makes it difficult to detect changing frequencies. With a narrow window, the reverse effect results. The Fast Fourier Transform presumes that there are periodic signals, so that pieces of information about the precise point in time at which an oscillation begins or ends are lost.

A control method is described in PCT Application No. WO 2010/054657 A1, in which a decay rate of an oscillation in a controlled variable of a PID controller is ascertained and the controlled variable is increased as a function of the decay rate. A high decay rate indicates a highly-oscillating system close to the stability limit, so that the reinforcement of the controlled variable is reduced, and a low decay rate indicates an excessive attenuation, so that the reinforcement of the controlled variable is increased.

SUMMARY

According to a first aspect, the present invention provides a method for determining oscillations occurring in a measuring signal. In accordance with an example embodiment of the present invention, the method includes receiving a measuring signal, determining the extreme values of the received measuring signal, and ascertaining closed loops of the measuring signal. The (all of the) closed loops of the measuring signal are ascertained by a) identifying a (first) closed loop in the measuring signal, a closed loop being formed by two half loops having identical oscillation width and opposing directions, b) storing the identified closed loop, and c) removing the identified closed loop from the measuring signal, mentioned steps a) through c) being repeated until all closed loops have been ascertained. The closed loops correspond to the oscillations occurring in the measuring signal.

The measuring signal is preferably a sensor signal of a sensor as is used in a control loop, for example, a control loop in a heating, ventilation, and air conditioning system. The expression "measuring signal," however, also includes signals which are derived from sensor signals, for example, by an estimation method.

The example method according to the present invention may have the advantage that oscillations in measuring signals of also more complex, real systems having various, nested, and mutually influencing controllers often from different suppliers may be ascertained easily, quickly, and robustly. The oscillations may be analyzed regardless of the origin of the measuring signal, in particular regardless of the particular sensor type.

The so-called rainflow counting method is preferably used to ascertain the closed loops of the measuring signal. The rainflow counting method has its origin in the field of material mechanics and is used there to determine the fatigue lifetime of components. The term "rainflow counting method" is derived from an analogy with the flowing of rainwater over pagoda roofs. The time axis of the relevant measuring signal is envisioned rotated by 90° clockwise. The ranges of the measuring signal are ascertained and counted as half loops (also called half hysteresis or half cycles), at which the "rainwater" drips from one "roof" onto the next roof underneath. In particular, the following are counted as half loops: i) a (signal) range which begins at one extreme value and ends opposite to a greater extreme value, ii) a range which begins at one extreme value and ends at the point at which the rainwater strikes which falls from an extreme value lying above it, and iii) a range which begins at one extreme value and ends at the end of the time series. Two half loops of identical size, i.e., identical oscillation width, which extend in opposite directions (i.e., are axially symmetrical with respect to an axis transverse to the time axis) form a closed loop (also called closed hysteresis or full cycle). Extreme values are formed by local minima and maxima and are also referred to as reversal points (see, for example, M. Kohler et al. "Zahlverfahren and Lastannahme in der Betriebsfestigkeit [counting methods and load assumption in operational stability]," Chapter 2.4.4, pages 23-27, DOI 10.1007/978-3-642-13164-6_2, Springer-Verlag, 2012).

The rainflow counting method permits, even in the case of measuring signals having large quantities of data, the quantity of data required for ascertaining the oscillations contained in the measuring signals to be reduced elegantly in such a way that efficient and time-saving and resource-saving analysis is possible, detailed pieces of information being able to be obtained about the oscillations occurring in the measuring signals.

The oscillation width of a half loop thus represents the amplitude of the oscillation occurring in the measuring signal which corresponds to the closed loop formed by this half loop. Furthermore, the mean value of an oscillation may be ascertained easily as half the amplitude of its half loop. Furthermore, the period duration of an oscillation occurring in the measuring signal results from twice the period of the half loop associated with this oscillation. Furthermore, the starting time of an oscillation occurring in the measuring signal corresponds to the starting time of the full loop associated with it, i.e., the starting time of its first half loop with respect to time. This applies accordingly to the end time of an oscillation. The analysis with respect to time enables a historic evaluation of the occurrence and disappearance of oscillations in measuring signals. Advantageously, no previous pieces of information about the oscillations to be expected in a measuring signal are required.

Limiting values with respect to the oscillation width/amplitude of a half loop and its duration (and thus the period duration of the oscillation) may preferably be specified in order to separate oscillations to be considered from oscillations not to be considered. For example, it may be specified in the case of a temperature measurement that half widths/oscillations having an amplitude of less than 1° C. and oscillations having a period duration of greater than 1 hour are to be ignored.

Using the above-described method for determining oscillations occurring in a measuring signal, measuring signals of a technical system may be systematically checked, measurement data of the same type but different locations, for example, from heating, ventilation, and air conditioning systems installed in different buildings, for example, being able to be compared with one another. This may be carried out, for example, with the aid of a central web platform.

In a method for monitoring a technical system, in particular a heating, ventilation, and air conditioning system, which uses the above method for determining oscillations occurring in a measuring signal, a warning may be output to a user or to service personnel or to a user group if, for example, the amplitude (oscillation width) and/or frequency of an ascertained oscillation occurring in a measuring signal exceeds a predefined limiting value. The output of the warning may be carried out with the aid of a display and/or an audio warning and/or via email and/or via electronic message according to another protocol. The output of the warning or the notification may be distributed to different receivers depending on amplitude or amplitude sum in one preferred specific embodiment of the present invention. This has the advantage that in the event of a greater deviation, the particular technical error may be escalated and communicated to a larger user group to initiate corresponding measures.

Furthermore, a counter may be provided which is incremented, for example, by one upon each ascertainment of a closed loop, i.e., an oscillation. If the counter and thus the number of the oscillations exceeds a predetermined limiting value, a warning may thus be output. Furthermore, the amplitudes of the oscillations occurring in a certain period, for example, one hour, may be added up and a warning may only be output if the sum of the totaled amplitudes exceeds a predetermined limiting value. An error diagnosis may follow the monitoring of the system. The ascertained signal (from the ascertained closed loops) may furthermore also be used as an input for data mining algorithms for the troubleshooting and isolation or more accurate localization of errors. It may thus be detected, for example, if a production error occurs more frequently from a certain amplitude. Furthermore, the ascertained signal may be used for better localization of an error, in particular in complex, multicomponent technical systems or facilities, in that it may be checked in which partial component of the facility the strongest oscillations occur.

Additionally or alternatively to monitoring, the above example method may be used for ascertaining oscillations occurring in a measuring signal for adaptive control of a technical system, in particular a heating, ventilation, and air conditioning system. In the case of adaptive control, the controller parameters adapt themselves to the system and changes in the process dynamics. Adaptive control is also referred to as self-learning control.

The setting of the parameters of the adaptive controller takes place as a function of the oscillations occurring in the particular measuring signal. The controller parameters are thus preferably set in such a way that the amplitude of the oscillations sinks below a predetermined minimum level. The method for computing the controller parameters within the scope of the method for ascertaining oscillations occurring in measuring signals may be based, for example, on the method of least squares. A PID controller is preferably used as an adaptive controller. Alternatively or in combination, however, another controller type, for example, a state controller may also be used. The controller may be a multidimensional controller. The above method for ascertaining oscillations occurring in measuring signals thus offers a cross-system, systematic approach for setting parameters of adaptive controllers.

In particular, misconfigured controllers may be recognized and avoided, unusual behavior of system components, which could result, for example, in a shortening of their lifetime, may be established, and predictive maintenance may be initiated by the provided monitoring and setting of an adaptive controller.

According to a further aspect of the present invention, an example processing unit is provided, which is configured to carry out the above method for ascertaining oscillations occurring in a measuring signal, the above method for monitoring, and/or the above method for setting an adaptive controller. Furthermore, an example computer program is provided, which is configured to carry out the above method for ascertaining oscillations occurring in a measuring signal, the above method for monitoring, and/or the above method for setting an adaptive controller. The computer program may be stored on a machine-readable memory medium, for example, an EEPROM, a flash memory, or a data carrier (for example, a DVD). It may furthermore be provided that the computer program is provided on a central server, on which it may be executed via a computer network (Internet, intranet, or the like) or from which it may be downloaded. The access to the computer program may take place via a web platform.

Further advantageous embodiments of the present invention result from the following description and the figures.

DETAILED DESCRIPTION OF EXAMPLE EMBODIMENTS

Figure 1:
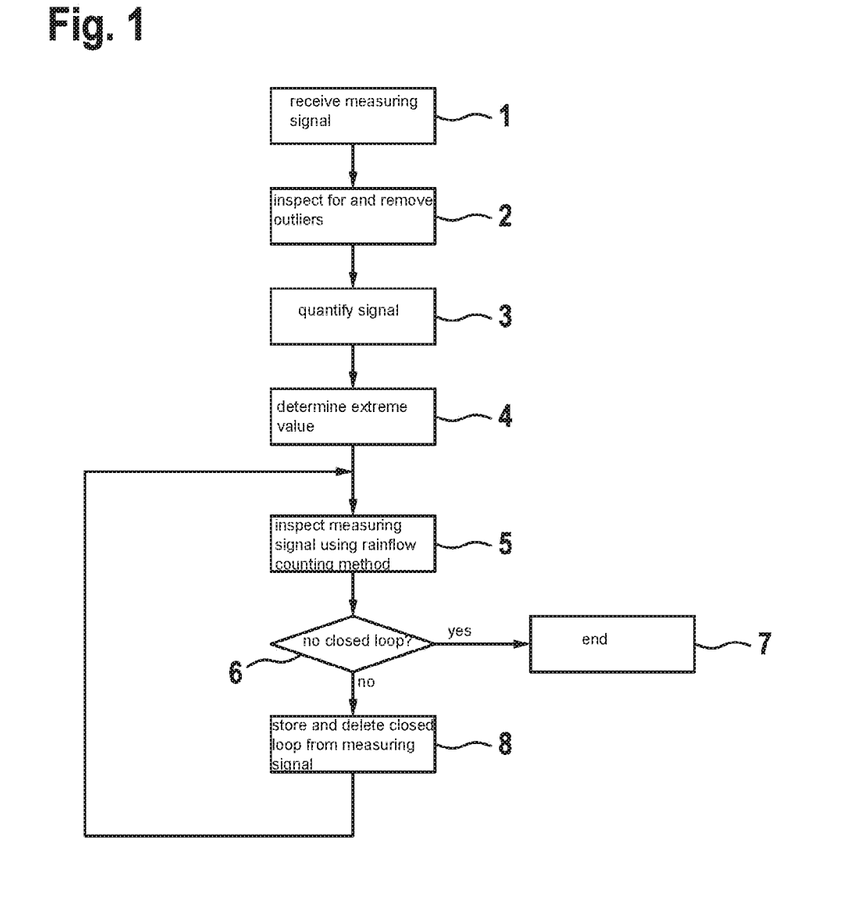
FIG. 1 shows a flow chart of a method for ascertaining oscillations occurring in a measuring signal according to one exemplary embodiment of the present invention.

FIG. 1 shows a flow chart of a method for ascertaining oscillations occurring in a measuring signal. The measuring signal may be, for example, a volume flow, a pressure upstream or downstream of a compressor, or a temperature.

In step 1, a measuring signal is received by a processing unit, for example, a computer or an electronic control unit (not shown). In a preferred, optional step 2, the received measuring signal is inspected for so-called outliers and these are removed from the measuring signal. A measured value is classified as an outlier, for example, if it deviates by a certain, predetermined amount from its preceding and/or its following measured value.

If the measuring signal is an analog instead of a digital signal, the measuring signal is preferably quantified in step 3. The sequence of steps 2 and 3 may be interchanged.

In following step 4, the extreme values of the measuring signal are determined, for example, by computing the first and second derivation of the measuring signal. For the determination of the extreme values, tolerances may be predefined which specify the minimum amount by which the extreme values are to deviate from one another, for example, to ignore minimal oscillations and the effect of noise and thus increase the accuracy of the oscillation ascertainment.

In following step 5, the measuring signal is preferably inspected with the aid of the rainflow counting method described at the outset for closed loops (full cycles, full hysteresis). Half loops (half cycles, half hysteresis) present in the measuring signal are ascertained. A closed loop results from two half loops of equal oscillation width but opposite direction.

If it is established in step 6 that the measuring signal does not contain a single closed loop, the method is thus ended in step 7. No oscillation could be ascertained in the measuring signal.

In contrast, if it is established in step 6 that a closed loop and thus an oscillation could be ascertained, it is thus stored in step 8, preferably together with its amplitude, starting time, end time, period duration/frequency, and/or mean value, in a memory medium (not shown), for example, a RAM, and the closed loop found is removed from the measuring signal, the remaining parts of the measuring signal being connected to one another.

Figure 2:
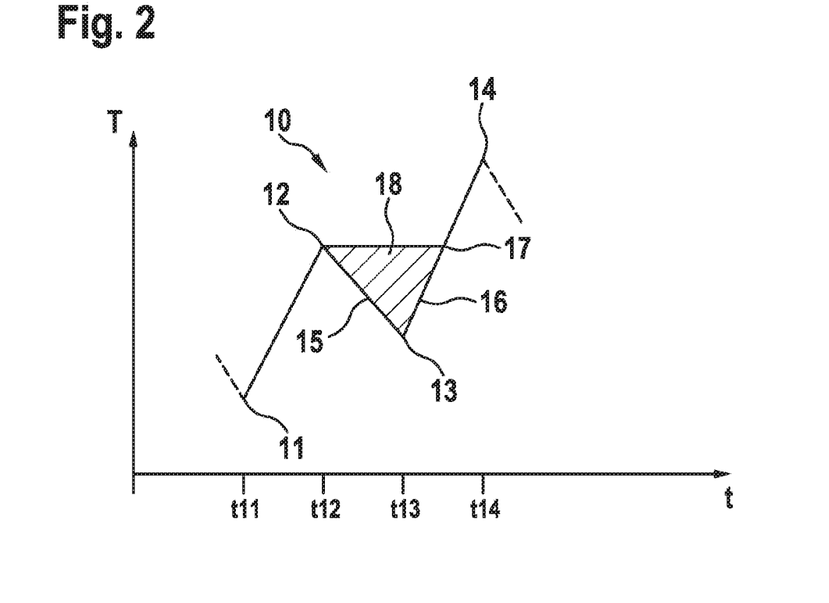
FIG. 2 shows a schematic diagram to explain an ascertainment of a closed loop in an exemplary measuring signal.

FIG. 2 is used to illustrate step 5 of FIG. 1. The measuring signal schematically shown by way of example in FIG. 2, which is, for example, a temperature T, has in the time range shown four extreme values 11, 12, 13, 14 at points in time t11, t12, t13, and t14, respectively. For a first half loop 15, whose oscillation width extends from maximum 12 to minimum 13 and which is found with the aid of the rainflow counting method, a corresponding second half loop 16 may be found in measuring signal 10 with the aid of the rainflow counting method, which has an identical oscillation width in the opposite direction. First half loop 15 is found, since it begins at maximum 12 and ends at minimum 13, which is opposite to the next maximum 14 with respect to time, which has a greater value than (starting) maximum 12 (condition i named at the outset) of the rainflow counting method. Second half loop 16 is found since it begins at an extreme value (minimum 13) and ends at a point 17 at which the "rainwater" strikes which "drips down" from maximum 12 in the direction of the time axis (condition ii named at the outset) of the rainflow counting method. First half loop 15 and second half loop 16 together form a closed loop, which corresponds to an oscillation in measuring signal 10.

Figure 3:
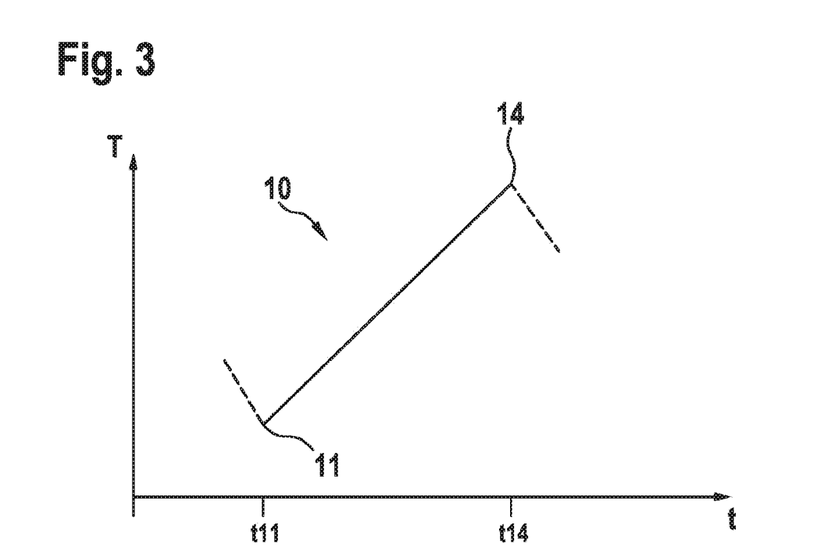
FIG. 3 shows a schematic diagram to explain the removal of an ascertained closed loop from the measuring signal.

In step 8 of FIG. 1, the identified closed loop, i.e., the corresponding oscillation and its properties, are stored and deleted from measuring signal 10, the remaining sections of the measuring signal being connected to one another. The latter is shown in FIG. 3. This means, triangle 18 shown in FIG. 2 is removed and the measuring signal shown in FIG. 3 results, which is then searched for further closed loops with the aid of the rainflow counting method.

Figure 4:
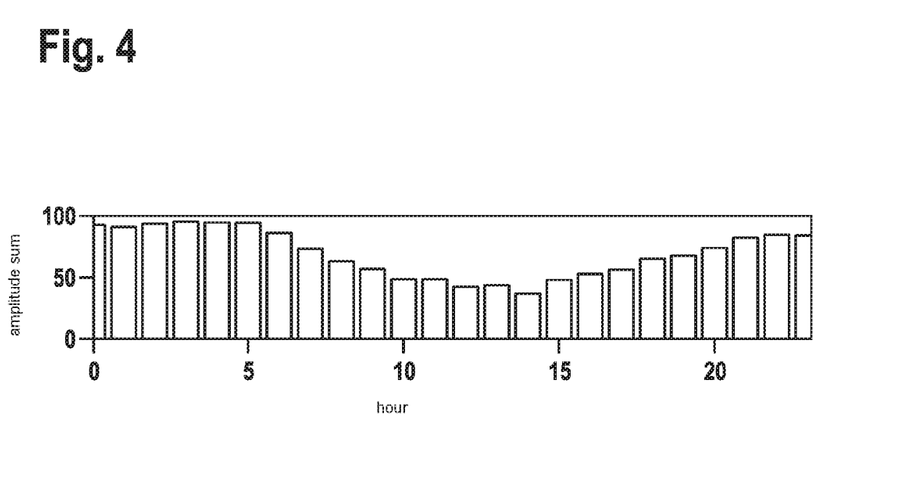
FIG. 4 shows an exemplary diagram of monitoring a compressor.

With the aid of the method shown by way of example in FIG. 1, oscillations occurring in a measuring signal may thus be ascertained. FIG. 4 shows, for the example of a compressor of a heating, ventilation, and air conditioning system, the oscillations per hour of a day ascertained with the aid of the method, in a measuring signal, which is a pressure downstream from the compressor, for example. The amplitudes of the oscillations ascertained for the particular hour are added up and averaged over an entire year. As is apparent, between 7 AM and 8 PM, there is a reduction in the level of the added up amplitudes. It may be concluded from this signal (curve) that outside the above-mentioned period, which corresponds to the main operating phase, the compressor has to clock more frequently at lower load demand. It may thus automatically be ascertained that a higher level of wear occurs outside the main operating phase.

Figure 5:
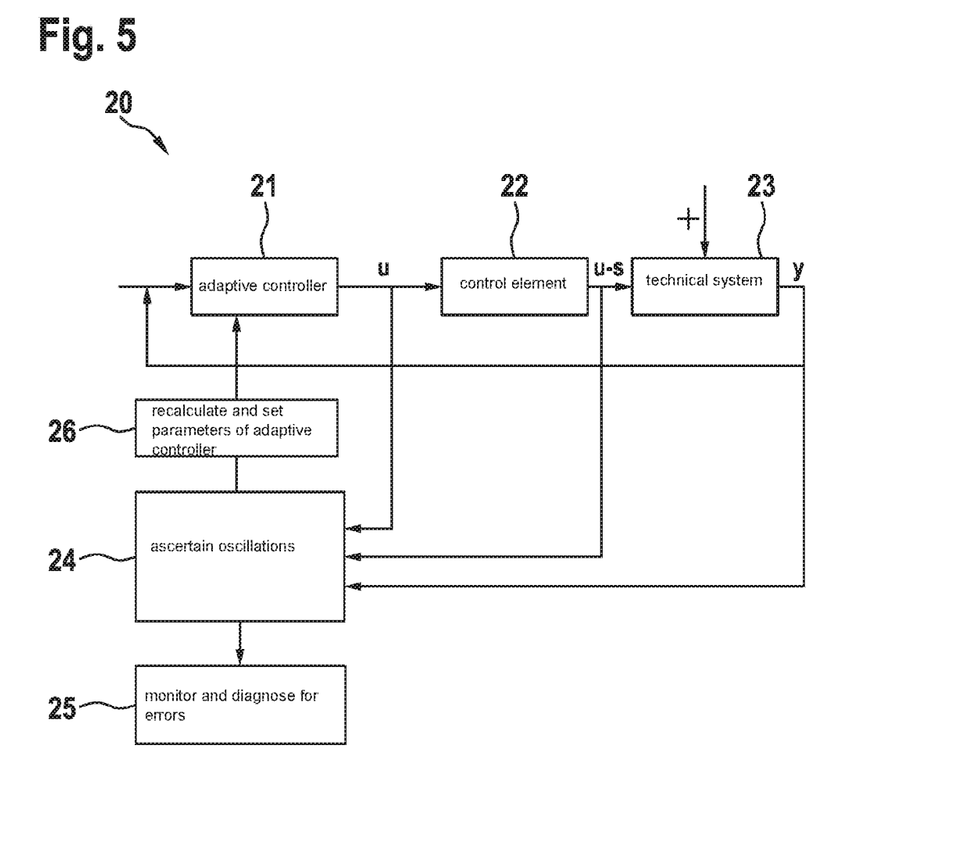
FIG. 5 shows a block diagram of a one-dimensional control loop having an adaptive controller.

FIG. 5 shows a schematically illustrated control loop 20 having an adaptive controller 21, which is preferably designed as an adaptive PID controller, a control element 22, for example, a valve, and a controlled system 23, which is provided by a technical system 23 to be controlled, for example, a heating, ventilation, and air conditioning system. Technical system 23 of FIG. 5 is a simple, i.e., a one-dimensional, system having only one input signal (the output signal of control element u s) and only one output signal (control variable y).

For example, the output signal of adaptive controller 21 (controlled variable u), the output variable of control element u s, and control variable y are supplied to a function block 24 as measuring signals. In function block 24, the method shown in FIG. 1 for ascertaining oscillations occurring in the particular measuring signal is carried out on each of these measuring signals. The oscillations ascertained in function block 24 or their properties such as amplitude, period duration, etc. are supplied to function block 25 for monitoring and error diagnosis of technical system 23, so that maintenance periods may be shortened, for example, in the case of oscillations of higher amplitude. Furthermore, the oscillations ascertained in function block 24 are used to recalculate and set the parameters of adaptive controller 21 in function block 26 in such a way that the oscillations of measuring signals u, u s, and y are minimized. Blocks 21, 24, 25, 26 may be implemented separately or jointly by software and/or hardware, for example, by a computer program which runs on a processor unit, for example, a server.

Figure 6:
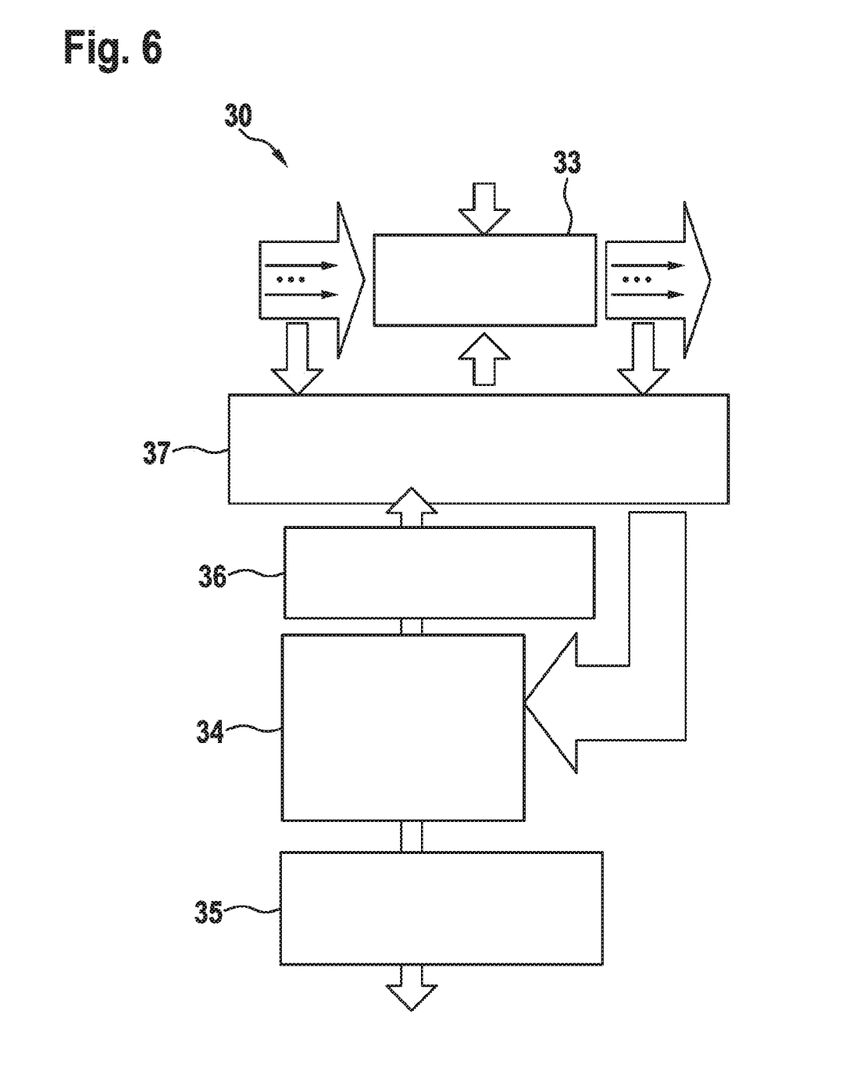
FIG. 6 shows a block diagram of a multidimensional control loop having an adaptive controller.

FIG. 6 shows an expansion from FIG. 5 to a multidimensional control loop 30 having a complex technical system 33, which has multiple input signals and output signals. In the local control shown in FIG. 5, the parameters of adaptive controller 21 may only be suitably set with the aid of function block 26 if the variables/signals in which oscillations occur in the case of misconfiguration of adaptive controller 21 are also input signals of function block 24 responsible for adaptive controller 21.

For the multidimensional control loop 30 shown in FIG. 6, a central measuring signal detection and automation unit 37 is provided, which detects all relevant measuring signals. The measuring signals detected by measuring signal detection and automation unit 37 are supplied to a function block 34, which carries out the method shown in FIG. 1 for ascertaining oscillations occurring in the measuring signals. The oscillations ascertained in function block 34 and their properties are transferred to function block 35 for monitoring and error diagnosis of technical system 33. Furthermore, the oscillations ascertained in function block 34 and their properties are supplied to function block 36 for adapting the controller parameters. In function block 36 or 37, correlations between the identified oscillations and the adaptive controllers used in control loop 30 are preferably ascertained, and the controller parameters of the controllers correlated most strongly with the particular oscillations are adapted in such a way that the oscillations correlated with them are minimized. The control takes place by central measuring signal detection and automation unit 37. Function blocks 34, 35, 36, 37 may be implemented together or separately in the form of software and/or hardware, in particular as a computer program on a server.

Figure 7:
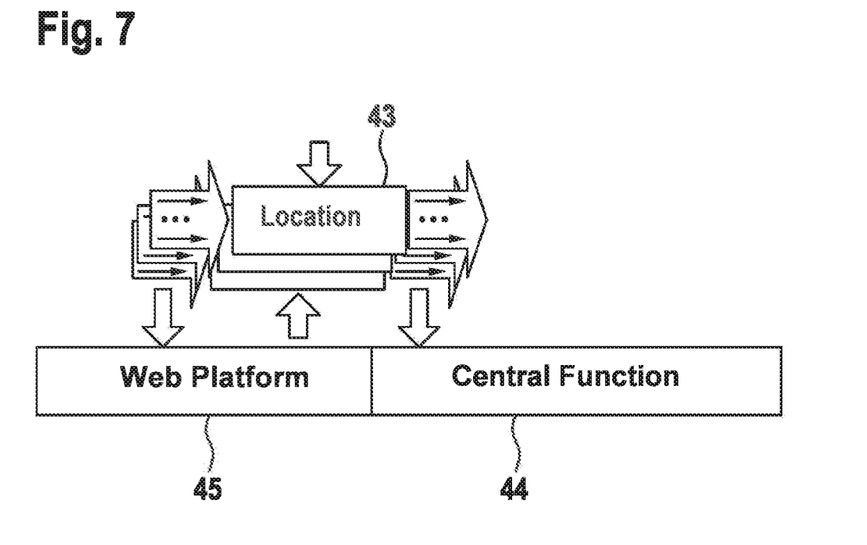
FIG. 7 shows a schematic view of an exemplary embodiment in which the present invention is used for monitoring multiple locations.

The method for ascertaining oscillations occurring in measuring signals according to the present invention may advantageously be used in a centralized manner for the parallel monitoring and/or control in particular of multiple locations 43 (i.e., multiple technical systems), for example, multiple production sites or buildings (see FIG. 7). Thus, for example, the heating, ventilation, and air conditioning systems of various buildings may be monitored and/or controlled centrally in parallel. All detected measuring signals of locations 43 are supplied to a central function block 44, which ascertains the oscillations occurring therein and their properties with the aid of the method shown in FIG. 1. Function block 44 is preferably implemented as software (a computer program) running on a central server. The server and the ascertained oscillations may be accessed via a web platform 45, and they may be centrally evaluated and displayed on the web platform for monitoring and error diagnosis purposes. For this purpose, corresponding monitoring and diagnostic software installed on the server may be accessed via the web platform. Furthermore, an adaptive adaptation of controller parameters may be prompted via the web platform, the recalculation of the controller parameters also being able to be implemented via software installed on the server. In this way, for example, a performance analysis across locations and possibly a power consumption reduction may be carried out.

What is claimed is:

1. A method for determining oscillations occurring in a measuring signal of a technical system, the method comprising:
   receiving the measuring signal;
   determining extreme values of the received measuring signal; and
   ascertaining closed loops of the measuring signal by:
      a) identifying a closed loop using the measuring signal, the closed loop being formed by two half loops having identical oscillation width and opposite direction;
      b) storing the identified closed loop;
      c) removing the identified closed loop; and
      d) repeating steps a) through c) until all closed loops have been ascertained;
   wherein the technical system includes an adaptive controller and parameters of the adaptive controller are set as a function of the oscillations which are correlated with the adaptive controller,
   wherein ascertained oscillations are used to recalculate and set the parameters of the adaptive controller so that the oscillations of the measuring signal are minimized, and
   wherein the closed loop results from two half loops of equal oscillation width but opposite direction, and wherein each of the half loops is defined by an amplitude, a starting time, an end time, a period duration/frequency, and/or a mean value.

2. The method as recited in claim 1, wherein a rainflow counting method is used to ascertain the closed loops.

3. The method as recited in claim 1, wherein: (i) an amplitude of each of the oscillations occurring in the measuring signal is ascertained from an oscillation width of a half of the closed loop corresponding to the oscillation, a period duration of each oscillation occurring in the measuring signal is ascertained from twice a duration of the half loop, and/or (ii) a starting point in time of each of the oscillations occurring in the measuring signal is ascertained from a starting point in time of the half loop.

4. The method as recited in claim 1, wherein a counter is incremented for each of the ascertained closed loops.

5. The method as recited in claim 1, wherein outliers are removed from the measuring signal prior to the determination of the extreme values of the received measuring signal.

6. A method for monitoring a technical system, the method comprising:
   for each measuring signal of one or multiple measuring signals, determining the oscillations occurring in the measuring signal by:
      receiving the measuring signal;
      determining extreme values of the received measuring signal; and
      ascertaining closed loops using the measuring signal by:
         a) identifying a closed loop using the measuring signal, the closed loop being formed by two half loops having identical oscillation width and opposite direction;
         b) storing the identified closed loop;
         c) removing the identified closed loop; and
         d) repeating steps a) through c) until all closed loops have been ascertained; and
   outputting a warning when: (i) an amplitude of an oscillation occurring in a measuring signal of the one or more measuring signals, and/or (ii) a number of the oscillations occurring in the measuring signal of the one-or more measuring signals, and/or (iii) added-up amplitudes of the oscillations occurring in the measuring signal of the one or more measuring signal, exceed a predetermined limiting value;
   wherein the technical system includes an adaptive controller and parameters of the adaptive controller are set as a function of the oscillations which are correlated with the adaptive controller,
   wherein ascertained oscillations are used to recalculate and set the parameters of the adaptive controller so that the oscillations of the measuring signal are minimized, and
   wherein the closed loop results from two half loops of equal oscillation width but opposite direction, and wherein each of the half loops is defined by an amplitude, a starting time, an end time, a period duration/ frequency, and/or a mean value.

7. The method as recited in claim 6, wherein the technical system includes a heating system, a ventilation system, and/or an air conditioning system.

8. The method as recited in claim 6, wherein the method is used for parallel monitoring of multiple technical systems, and wherein the method is carried out via a web platform.

9. A method for adaptive control of a technical system, the method comprising:
for each measuring signal of one or multiple measuring signals, determining the oscillations occurring in the measuring signal by:
receiving the measuring signal;
determining extreme values of the received measuring signal; and
ascertaining closed loops using the measuring signal by:
a) identifying a closed loop using the measuring signal, the closed loop being formed by two half loops having identical oscillation width and opposite direction;
b) storing the identified closed loop;
c) removing the identified closed loop; and
d) repeating steps a) through c) until all closed loops of the measuring signal have been ascertained; and
setting parameters of an adaptive controller for the technical system as a function of the oscillations occurring in the measuring signals;
wherein the technical system includes an adaptive controller and parameters of the adaptive controller are set as a function of the oscillations which are correlated with the adaptive controller,
wherein ascertained oscillations are used to recalculate and set the parameters of the adaptive controller so that the oscillations of the measuring signal are minimized, and
wherein the closed loop results from two half loops of equal oscillation width but opposite direction, and wherein each of the half loops is defined by an amplitude, a starting time, an end time, a period duration/ frequency, and/or a mean value.

10. The method as recited in claim 9, wherein the technical system includes a heating system, a ventilation system, and/or an air conditioning system.

11. The method as recited in claim 9, wherein the adaptive controller is an adaptive PID controller.

12. The method as recited in claim 9, wherein the technical system includes multiple adaptive controllers and parameters of each adaptive controller of the adaptive controllers are set as a function of those oscillations which are correlated with the adaptive controller.

13. The method as recited in claim 9, wherein the method is used for adaptive control of multiple technical systems, and wherein the method is carried out via a web platform.

14. A processing device to determine oscillations occurring in a measuring signal, comprising:
a processing unit configured to perform the following:
receiving the measuring signal;
determining extreme values of the received measuring signal; and
ascertaining closed loops using the measuring signal by:
a) identifying a closed loop using the measuring signal, the closed loop being formed by two half loops having identical oscillation width and opposite direction;
b) storing the identified closed loop;
c) removing the identified closed loop; and
d) repeating steps a) through c) until all closed loops have been ascertained;
wherein the technical system includes an adaptive controller and parameters of the adaptive controller are set as a function of the oscillations which are correlated with the adaptive controller,
wherein ascertained oscillations are used to recalculate and set the parameters of adaptive controller so that the oscillations of measuring signals are minimized, and
wherein the closed loop results from two half loops of equal oscillation width but opposite direction, and wherein each of the half loops is defined by an amplitude, a starting time, an end time, a period duration/ frequency, and/or a mean value.

15. A non-transitory machine-readable memory medium, on which is stored a computer program, which is executable by a processor, comprising:
a program code arrangement having program code for determining oscillations occurring in a measuring signal by performing the following:
receiving the measuring signal;
determining extreme values of the received measuring signal; and
ascertaining closed loops using the measuring signal by:
a) identifying a closed loop using the measuring signal, the closed loop being formed by two half loops having identical oscillation width and opposite direction;
b) storing the identified closed loop;
c) removing the identified closed loop; and
d) repeating steps a) through c) until all closed loops have been ascertained;
wherein the technical system includes an adaptive controller and parameters of the adaptive controller are set as a function of the oscillations which are correlated with the adaptive controller,
wherein ascertained oscillations are used to recalculate and set the parameters of adaptive controller so that the oscillations of measuring signals are minimized, and
wherein the closed loop results from two half loops of equal oscillation width but opposite direction, and wherein each of the half loops is defined by an amplitude, a starting time, an end time, a period duration/ frequency, and/or a mean value.

* * * * *